US012440840B2

(12) United States Patent
Huang et al.

(10) Patent No.: US 12,440,840 B2
(45) Date of Patent: Oct. 14, 2025

(54) CONTACTLESS SELECTION DEVICE, LIGHT SENSING STRUCTURE THEREOF, AND BIOLOGICAL PARTICLE SELECTION APPARATUS

(71) Applicant: CYTOAURORA BIOTECHNOLOGIES, INC., Hsinchu County (TW)

(72) Inventors: Chung-Er Huang, Hsinchu County (TW); Sheng-Wen Chen, Hsinchu County (TW); Hsin-Cheng Ho, Hsinchu County (TW)

(73) Assignee: CYTOAURORA BIOTECHNOLOGIES, INC., Hsinchu County (TW)

(*) Notice: Subject to any disclaimer, the term of this patent is extended or adjusted under 35 U.S.C. 154(b) by 539 days.

(21) Appl. No.: 17/987,978

(22) Filed: Nov. 16, 2022

(65) Prior Publication Data

US 2024/0050948 A1 Feb. 15, 2024

(30) Foreign Application Priority Data

Aug. 10, 2022 (TW) .................................. 111129949

(51) Int. Cl.
*B01L 3/00* (2006.01)
*B03C 5/00* (2006.01)

(52) U.S. Cl.
CPC ... *B01L 3/502761* (2013.01); *B01L 3/502715* (2013.01); *B03C 5/005* (2013.01);
(Continued)

(58) Field of Classification Search
CPC ......... B01L 3/502707; B01L 3/502715; B01L 3/502761; B01L 2200/0652;
(Continued)

(56) References Cited

U.S. PATENT DOCUMENTS

2009/0205963 A1* 8/2009 Medoro ............. G01N 15/1459 204/627
2014/0008230 A1* 1/2014 Chen ....................... B03C 5/024 204/643

(Continued)

FOREIGN PATENT DOCUMENTS

| | | | |
|---|---|---|---|
| TW | 202126571 | A | 7/2021 |
| TW | M636412 | U | 1/2023 |
| WO | WO2017075295 | A1 | 5/2017 |

OTHER PUBLICATIONS

Hsan-Yin Hsu,Aaron T. Ohta,Pei-Yu Chiou,Arash Jamshidi,Steven L. Neale, Ming C. Wu,"Phototransistor-based optoelectronic tweezers for dynamic cell manipulation in cell culture media",Lab on a Chip, 2010,10, Sep. 7, 2009,pp. 165-172.

*Primary Examiner* — Michael L Hobbs
(74) *Attorney, Agent, or Firm* — Li & Cai Intellectual Property (USA) Office

(57) ABSTRACT

A contactless selection device, a light sensing structure thereof, and a biological particle selection apparatus are provided. The light sensing structure includes a substrate, an insulating layer, an electrode layer, and a photoelectric layer, the latter two of which are respectively formed on two opposite sides of the substrate. The photoelectric layer includes a plurality of collector regions, a plurality of base regions respectively formed in the collector regions, and a plurality of emitter regions that are respectively formed in the base regions. Each of the emitter regions includes a plurality of emitter pads formed in the corresponding base region. Each of the base regions, the corresponding collector region, and the corresponding emitter region are jointly formed as a vertical transistor. The insulating layer covers and separates the vertical transistors and an end of each of the emitter pads is exposed from the insulating layer.

20 Claims, 14 Drawing Sheets

(52) U.S. Cl.
CPC .................. *B01L 2200/0652* (2013.01); *B01L 2300/0645* (2013.01); *B01L 2400/0424* (2013.01)

(58) Field of Classification Search
CPC ..... B01L 2300/0645; B01L 2300/0654; B01L 2300/0663; B01L 2300/0816; B01L 2400/0424; B03C 5/005; B03C 5/026; B03C 2201/26; H10F 30/21; H10F 39/107; H10F 77/206; H10F 77/241
See application file for complete search history.

(56) References Cited

U.S. PATENT DOCUMENTS

| | | | |
|---|---|---|---|
| 2014/0124370 | A1 | 5/2014 | Short et al. |
| 2014/0284669 | A1 | 9/2014 | Arcuri et al. |
| 2018/0193835 | A1 | 7/2018 | Hobbs et al. |
| 2021/0339249 | A1 | 11/2021 | Breinlinger et al. |
| 2022/0018755 | A1 | 1/2022 | Shkolnikov et al. |

* cited by examiner

CONTACTLESS SELECTION DEVICE, LIGHT SENSING STRUCTURE THEREOF, AND BIOLOGICAL PARTICLE SELECTION APPARATUS

CROSS-REFERENCE TO RELATED PATENT APPLICATION

This application claims the benefit of priority to Taiwan Patent Application No. 111129949, filed on Aug. 10, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a selection device, and more particularly to a contactless selection device, a light sensing structure thereof, and a biological particle selection apparatus.

BACKGROUND OF THE DISCLOSURE

A conventional biological particle selection device can drive movement of a target biological particle by applying an electric field there-around. However, in order to enable the conventional biological particle selection device to accurately move the target biological particle along a predetermined path without coming in contact with the target biological particle, further improvement need be made to the conventional biological particle selection device.

SUMMARY OF THE DISCLOSURE

In response to the above-referenced technical inadequacy, the present disclosure provides a contactless selection device, a light sensing structure thereof, and a biological particle selection apparatus to effectively improve on the issues associated with conventional biological particle selection devices.

In one aspect, the present disclosure provides a biological particle selection apparatus for selecting a target biological particle from a liquid specimen. The biological particle selection apparatus includes a contactless selection device and an alternating current (AC) power device. The contactless selection device includes a light sensing structure and a mating structure. The light sensing structure includes a first substrate, a first electrode layer, a photoelectric layer, and an insulating layer. The first electrode layer is formed on one side of the first substrate. The photoelectric layer is formed on another side of the first substrate, and includes a collector layer, a plurality of base regions, and a plurality of emitter regions. The collector layer is formed on the first substrate. The collector layer includes a plurality of collector regions spaced apart from each other, and an end of each of the collector regions away from the first electrode layer has a first slot-like portion. The base regions are respectively formed in the first slot-like portions of the collector regions.

Moreover, an end of each of the base regions away from the first electrode layer has a plurality of second slot-like portions spaced apart from each other. The emitter regions are respectively formed in the base regions. Each of the emitter regions includes a plurality of emitter pads respectively formed in the second slot-like portions of a corresponding one of the base regions. Each of the base regions, a corresponding one of the collector regions, and a corresponding one of the emitter regions are jointly formed as a vertical transistor. The insulating layer covers the vertical transistors and separates the vertical transistors from each other. An end of each of the emitter pads away from the first electrode layer is exposed from the insulating layer. The mating structure is spaced apart from the light sensing structure. At least one of the mating structure and the light sensing structure is transparent, and the mating structure includes a second substrate and a second electrode layer that is formed on the second substrate and that faces toward the light sensing structure. The AC power device is electrically coupled to the first electrode layer and the second electrode layer. When the liquid specimen is located between the insulating layer and the second electrode layer of the contactless selection device, any one of the vertical transistors of the contactless selection device is configured to be irradiated by a light source so as to allow a plurality of dielectrophoresis (DEP) forces to be applied to move the target biological particle through a distribution of the emitter pads and an electric field difference that is generated in the liquid specimen from non-uniform electric fields of the emitter pads.

In another aspect, the present disclosure provides a contactless selection device for selecting a target biological particle from a liquid specimen. The contactless selection device includes a light sensing structure and a mating structure. The light sensing structure includes a first substrate, a first electrode layer, a photoelectric layer, and an insulating layer. The first electrode layer is formed on one side of the first substrate. The photoelectric layer is formed on another side of the first substrate, and includes a collector layer, a plurality of base regions, and a plurality of emitter regions. The collector layer is formed on the first substrate. The collector layer includes a plurality of collector regions spaced apart from each other, and an end of each of the collector regions away from the first electrode layer has a first slot-like portion. The base regions are respectively formed in the first slot-like portions of the collector regions. Moreover, an end of each of the base regions away from the first electrode layer has a plurality of second slot-like portions spaced apart from each other. The emitter regions are respectively formed in the base regions. Each of the emitter regions includes a plurality of emitter pads respectively formed in the second slot-like portions of a corresponding one of the base regions. Each of the base regions, a corresponding one of the collector regions, and a corresponding one of the emitter regions are jointly formed as a vertical transistor. The insulating layer covers the vertical transistors and separates the vertical transistors from each other. An end of each of the emitter pads away from the first electrode layer is exposed from the insulating layer. The mating structure is spaced apart from the light sensing structure. At least one of the mating structure and the light sensing structure is transparent, and the mating structure includes a second substrate and a second electrode layer that is formed on the second substrate and that faces toward the light sensing structure. Moreover, a space between the insulating layer and the second electrode layer of the contactless selection device is configured to accommodate the liquid specimen for implementing a selection process on the target biological particle.

In yet another aspect, the present disclosure provides a light sensing structure of a contactless selection device. The light sensing structure includes a first substrate, a first electrode layer, a photoelectric layer, and an insulating layer. The first electrode layer is formed on one side of the first substrate. The photoelectric layer is formed on another side of the first substrate, and includes a collector layer, a plurality of base regions, and a plurality of emitter regions. The collector layer is formed on the first substrate. The collector layer includes a plurality of collector regions spaced apart from each other, and an end of each of the collector regions away from the first electrode layer has a first slot-like portion. The base regions are respectively formed in the first slot-like portions of the collector regions. Moreover, an end of each of the base regions away from the first electrode layer has a plurality of second slot-like portions spaced apart from each other. The emitter regions are respectively formed in the base regions. Each of the emitter regions includes a plurality of emitter pads respectively formed in the second slot-like portions of a corresponding one of the base regions. Each of the base regions, a corresponding one of the collector regions, and a corresponding one of the emitter regions are jointly formed as a vertical transistor. The insulating layer covers the vertical transistors and separates the vertical transistors from each other. An end of each of the emitter pads away from the first electrode layer is exposed from the insulating layer.

Therefore, the photoelectric layer provided in the contactless selection device, the light sensing structure, or the biological particle selection apparatus of the present disclosure has a specific structural design, so that the emitter pads of any one of the vertical phototransistors can be used in a contactless photoelectric coupling manner to generate the electric fields jointly forming the electric field difference that is similar to a corona discharge, thereby enabling the emitter pads of any one of the vertical phototransistors to accurately move (or capture) the target biological particle to any position.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
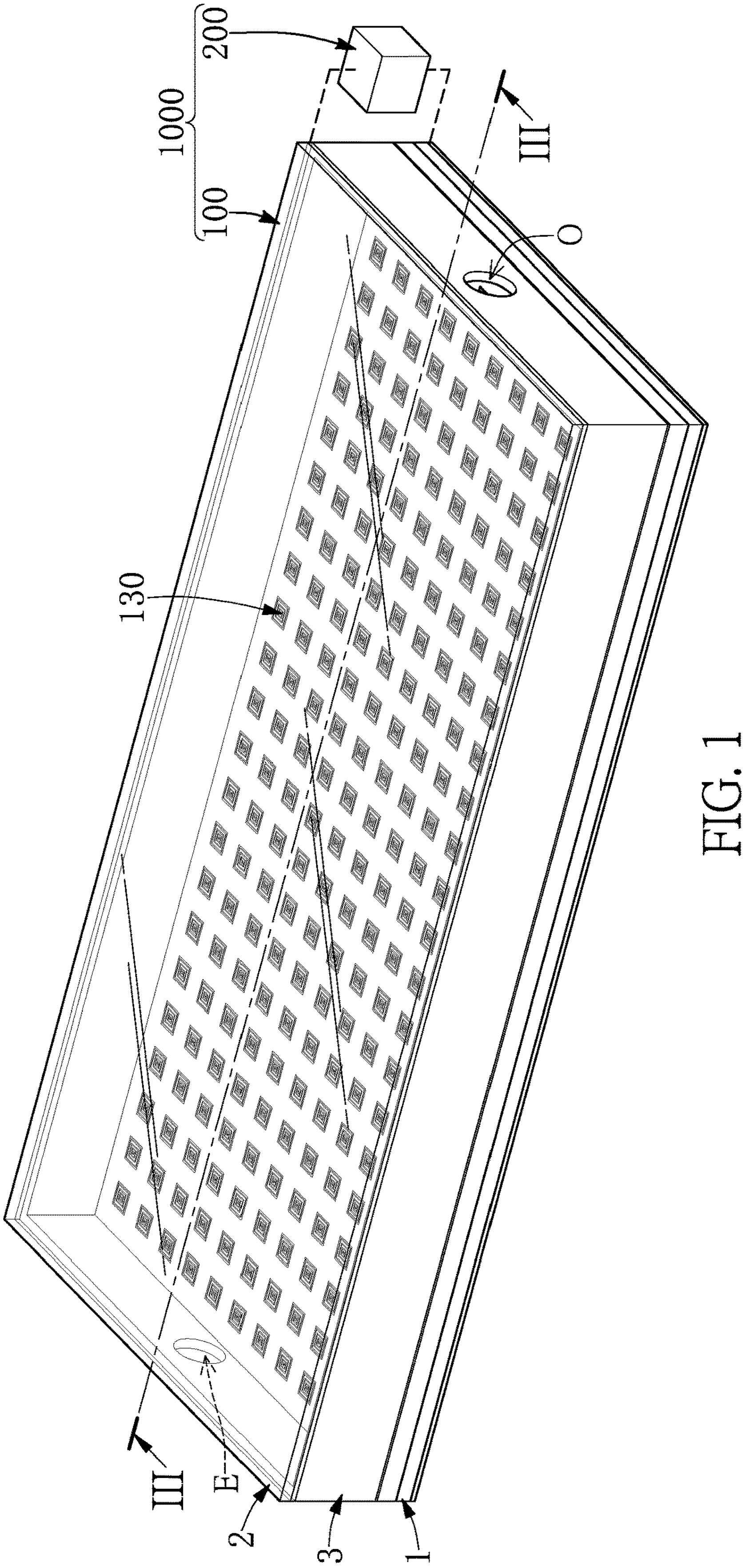
FIG. 1 is a perspective view of a biological particle selection apparatus according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
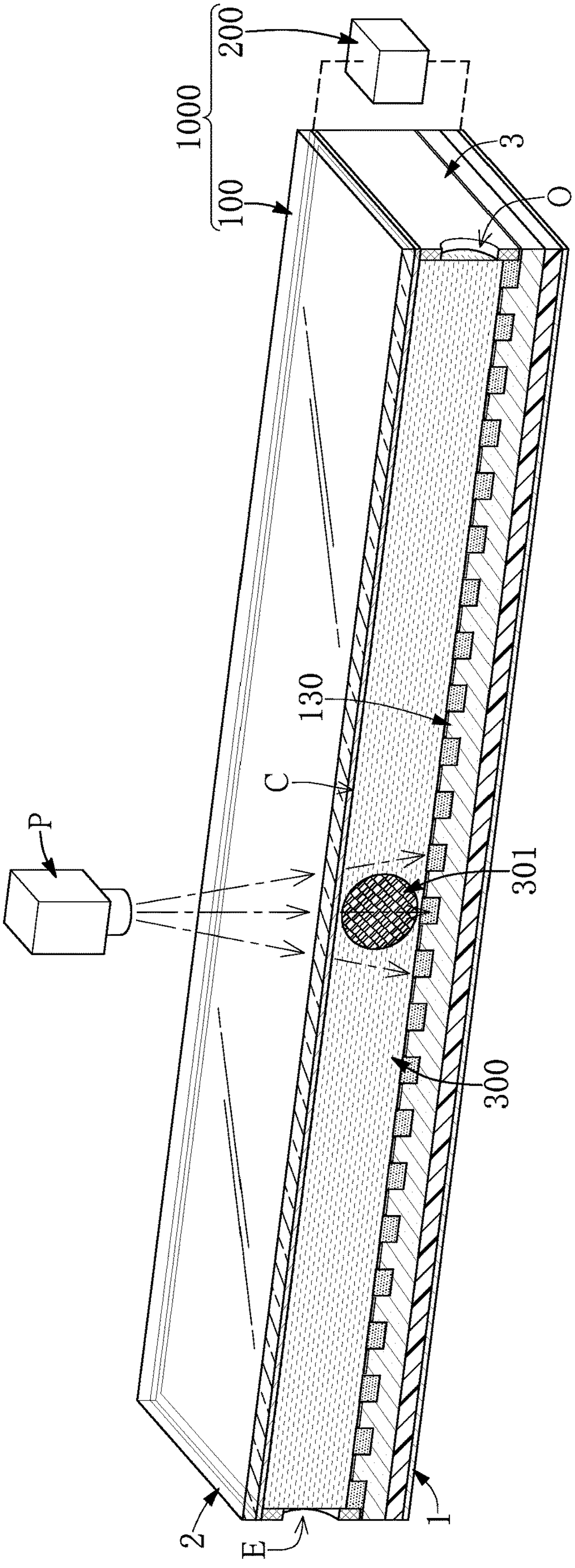
FIG. 2 is a perspective cross-sectional view showing the biological particle selection apparatus of FIG. 1 used to be injected with a liquid specimen.
Figure 3:
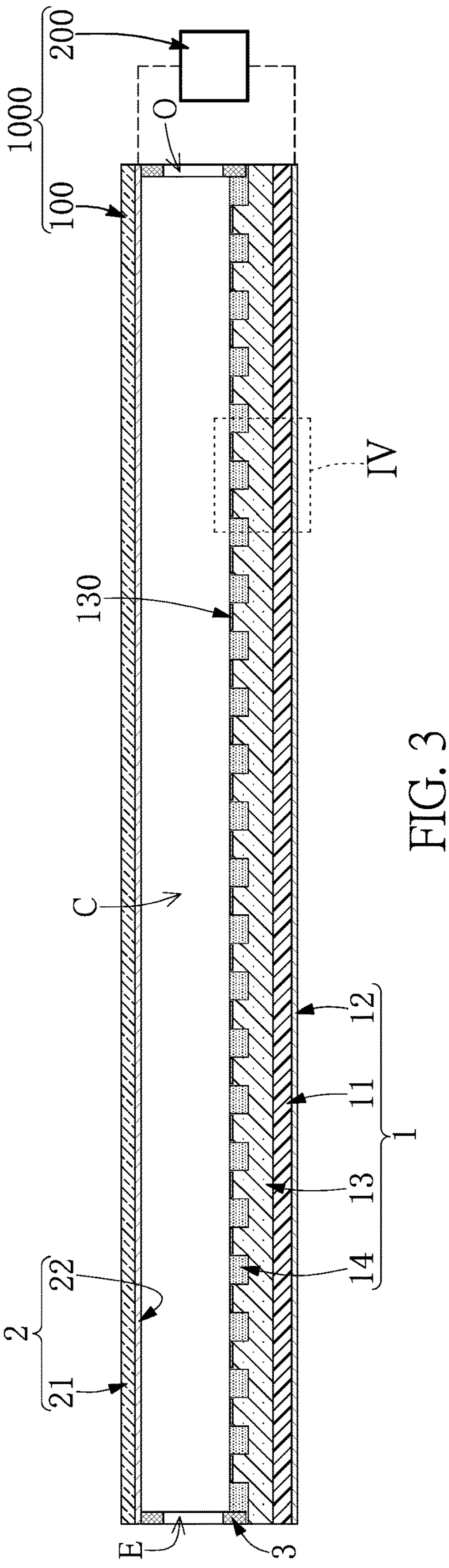
FIG. 3 is a cross-sectional view taken along line III-III of FIG. 1.

Referring to FIG. 1 to FIG. 8, a first embodiment of the present disclosure provides a biological particle selection apparatus 1000. As shown in FIG. 1 to FIG. 3, the biological particle selection apparatus 1000 in the present embodiment is provided for selecting a target biological particle 301 from a liquid specimen 300. In other words, any selection apparatus not provided for selecting a biological particle is different from the biological particle selection apparatus 1000 of the present embodiment.

The liquid specimen 300 can be a body fluid from an animal (e.g., blood, lymph, saliva, or urine), and the target biological particle 301 can be a specific type of cell, such as circulating tumor cells (CTCs), fetal nucleated red blood cells (FNRBCs), virus, or bacteria, but the present disclosure is not limited thereto. For example, in other embodiments of the present disclosure not shown in the drawings, the liquid specimen 300 can also be obtained from plants.

Moreover, the biological particle selection apparatus 1000 in the present embodiment includes a contactless selection device 100 and an alternating current (AC) power device 200 that is electrically coupled to the contactless selection device 100, but the present disclosure is not limited thereto. For example, in other embodiments of the present disclosure not shown in the drawings, the contactless selection device 100 can be independently used (e.g., sold) or can be used in cooperation with other devices. The following description describes the structure and connection relationship of each component of the contactless selection device 100, and then describes the connection relationship between the contactless selection device 100 and the AC power device 200.

It should be noted that the contactless selection device 100 of the present embodiment is formed at a chip-scale (e.g., a thickness of the contactless selection device 100 is less than or equal to 100 μm), and the contactless selection device 100 shown in the drawings is a rectangular structure, but the present disclosure is not limited thereto. For example, in other embodiments of the present disclosure not shown in the drawings, the contactless selection device 100 can be a curved structure or an irregular structure.

Specifically, the contactless selection device 100 in the present embodiment includes a light sensing structure 1, a mating structure 2 spaced apart from the light sensing structure 1, and a bonding layer 3 that is connected to and located between the light sensing structure 1 and the mating structure 2. In order to clearly describe the contactless selection device 100, the mating structure 2 in the present embodiment is transparent. According to practical requirements, at least one of the mating structure 2 and the light sensing structure 1 can be transparent so as to enable the contactless selection device 100 to be normally operated.

Figure 4:
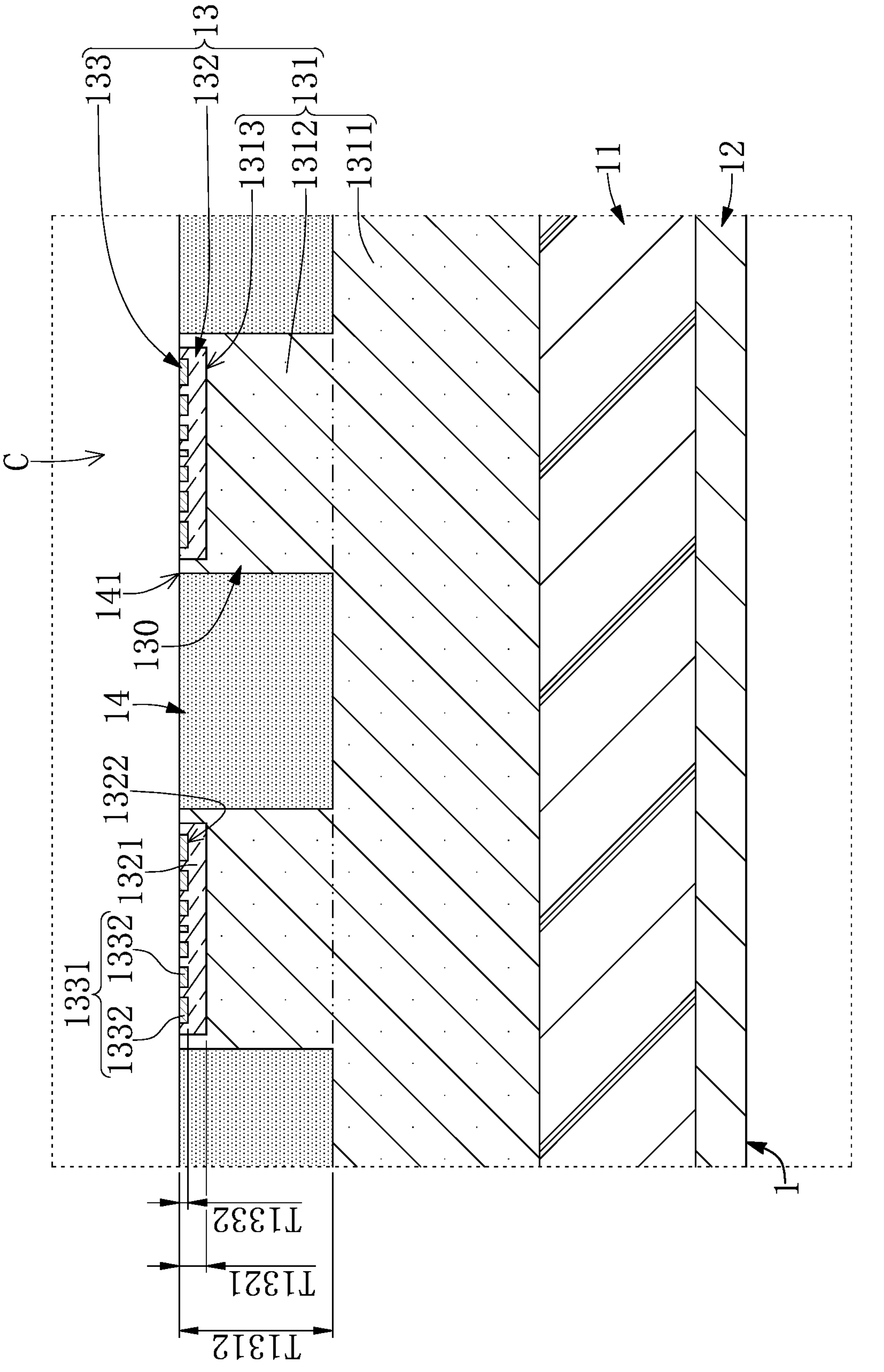
FIG. 4 is an enlarged view of part IV of FIG. 3.

As shown in FIG. 2 to FIG. 4, the light sensing structure 1 includes a first substrate 11, a first electrode layer 12 formed on one side (e.g., a bottom side) of the first substrate 11, a photoelectric layer 13 formed on another side (e.g., a top side) of the first substrate 11, and an insulating layer 14 that covers a part of the photoelectric layer 13. In the present embodiment, the first substrate 11 can be a silicon substrate and is preferably a low-doped N-type layer, the first electrode layer 12 can cover an entirety of the bottom side of the first substrate 11, and the first electrode layer 12 is preferably a thin conductive metal layer or an indium tin oxide (ITO) layer.

The photoelectric layer 13 in the present embodiment includes a collector layer 131 formed on the first substrate 11, a plurality of base regions 1321 formed in the collector layer 131, and a plurality of emitter regions 1331 that are respectively formed in the base regions 1321. In other words, the collector layer 131 is a N-type layer; the base regions 1321 are located at a same height with respect to the first electrode layer 12 and are jointly defined as a base layer 132 that is a P-type layer; and the emitter regions 1331 are located at a same height with respect to the first electrode layer 12 and are jointly defined as an emitter layer 133 that is a heavily doped N-type layer.

Specifically, the collector layer 131 in the present embodiment includes a connection layer 1311 formed on the first substrate 11 and a plurality of collector regions 1312 that are formed on the connection layer 1311 and that are spaced apart from each other. Moreover, an end (e.g., a top end) of each of the collector regions 1312 away from the first electrode layer 12 has a first slot-like portion 1313.

It should be noted that the collector regions 1312 of the present embodiment are electrically coupled to each other through the connection layer 1311, but the present disclosure is not limited thereto. For example, in other embodiments of the present disclosure not shown in the drawings, according to design requirements, the collector layer 131 can be provided without the connection layer 1311, the collector regions 1312 are directly formed on the first substrate 11, and the first substrate 11 can be a low-doped N-type layer, so that the first substrate 11 and the collector layer 131 can be jointly used as a collector.

The base regions 1321 are respectively formed in the first slot-like portions 1313 of the collector regions 1312 (i.e., each of the collector regions 1312 is formed with one of the base regions 1321 arranged therein), and an end (e.g., a top end) of each of the base regions 1321 away from the first electrode layer 12 has a plurality of second slot-like portions 1322 spaced apart from each other.

Moreover, the emitter regions 1331 are respectively formed in the base regions 1321 (i.e., each of the base regions 1321 is formed with one of the emitter regions 1331 arranged therein). Each of the emitter regions 1331 includes a plurality of emitter pads 1332 respectively formed in the second slot-like portions 1322 of a corresponding one of the base regions 1321.

In summary, each of the base regions 1321, a corresponding one of the collector regions 1312, and a corresponding one of the emitter regions 1331 are jointly formed as a vertical transistor 130. The insulating layer 14 in the present embodiment is a silicon nitride layer or a silicon oxide layer, but the present disclosure is not limited thereto. The insulating layer 14 covers the vertical transistors 130 and separates the vertical transistors 130 from each other, and an end (e.g., a top end) of each of the emitter pads 1322 away from the first electrode layer 12 is exposed from the insulating layer 14. In other words, the insulating layer 14 covers and is connected to the connection layer 1311 and a surrounding lateral surface of each of the vertical transistors 130.

Specifically, the arrangement of the insulating layer 14 and the vertical transistors 130 can be adjusted or changed according to design requirements, and the following description of the present embodiment only describes two possible configurations, but the present disclosure is not limited thereto.

As shown in FIG. 4, a space between any two of the vertical transistors 130 adjacent to each other is fully filled with the insulating layer 14, the insulating layer 14 has a plurality of openings 141 respectively corresponding in position to the vertical transistors 130 (e.g., any one of the openings 141 corresponds in shape to the end of a corresponding one of the collector region s1312), and the ends of the emitter pads 1332 of each of the vertical transistors 130 are exposed from the insulating layer 14 through a corresponding one of the openings 141.

Figure 5:
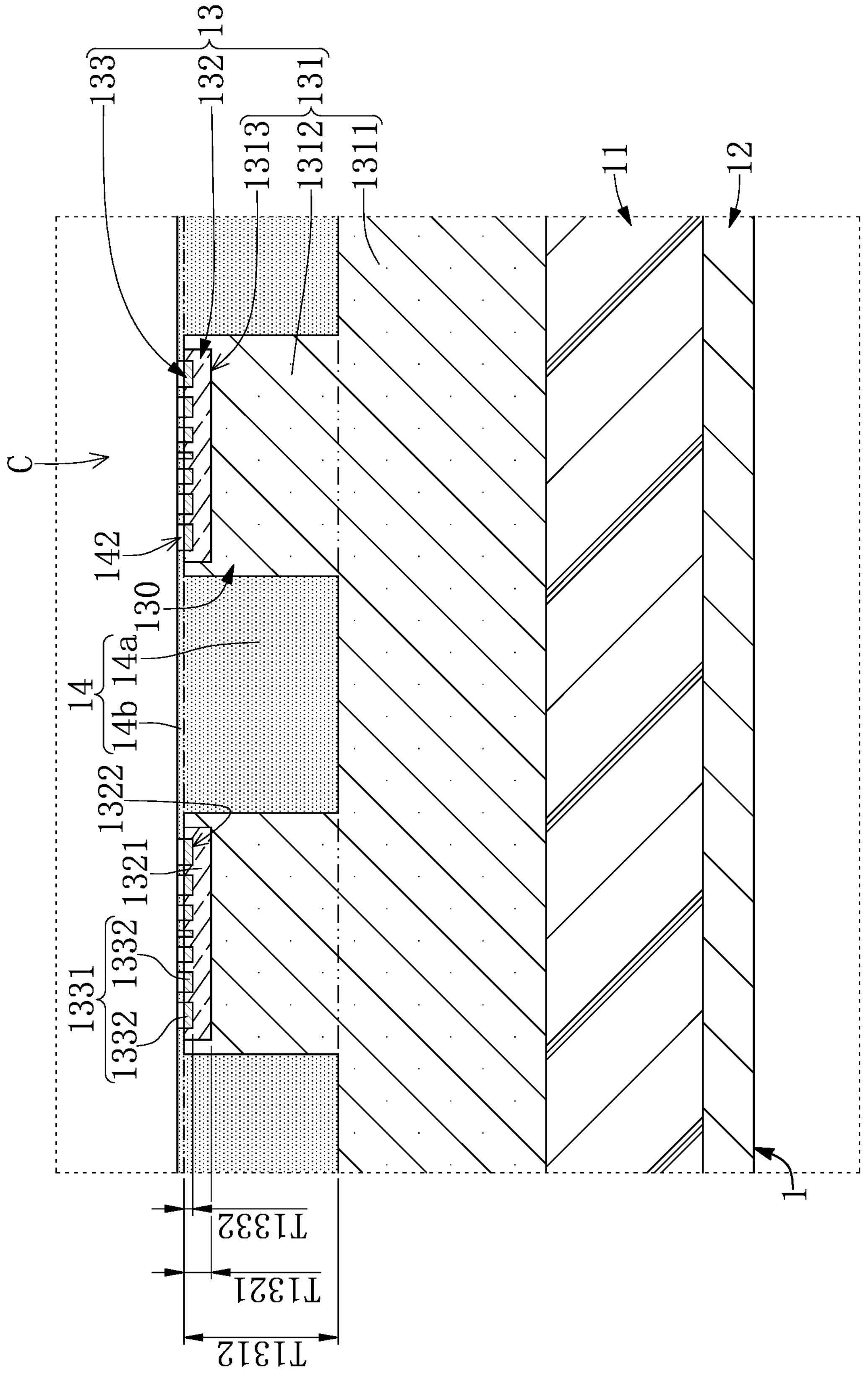
FIG. 5 is an enlarged view showing a structure of FIG. 4 in another configuration.

In addition, as shown in FIG. 5, a space between any two of the vertical transistors 130 adjacent to each other is fully filled with the insulating layer 14, the insulating layer 14 has a plurality of openings 142 respectively corresponding in position to the emitter pads 1332 of the vertical transistors 130 (e.g., any one of the openings 141 corresponds in shape to the end of a corresponding one of the emitter pads 1332), and the end of each of the emitter pads 1332 is exposed from the insulating layer 14 through a corresponding one of the openings 142. Specifically, the insulating layer 14 shown in FIG. 5 includes a first insulating layer 14*a* located besides the vertical transistors 130 and a second insulating layer 14*b* that is formed on a top side of the first insulating layer 14*a* and that protrudes from the vertical transistors 130, and the first insulating layer 14*a* and the second insulating layer 14*b* can be made of a same material or different materials according to design requirements, and the present disclosure is not limited thereto.

As the vertical transistors 130 in the present embodiment are of substantially the same structure, the following description discloses the structure of just one of the vertical transistors 130 for the sake of brevity, but the present disclosure is not limited thereto. For example, in other embodiments of the present disclosure not shown in the drawings, the vertical transistors 130 can be of different structures.

In the present embodiment, the end of the collector region 1312, the end of the base region 1321, and the end of each of the emitter pads 1332 are preferably coplanar with each other, each of the emitter pads 1332 has a width greater than a thickness T1332 thereof, and any two of the emitter pads 1332 adjacent to each other have a distance therebetween that is less than 5 μm, but the present disclosure is not limited thereto. In addition, a thickness T1321 of the base region 1321 is within a range from 15% to 35% of a thickness T1312 of the collector region 1312, and the thickness T1332 of each of the emitter pads 1332 is within a range from 5% to 20% of the thickness T1321 of the base region 1321, but the present disclosure is not limited thereto.

It should be noted that from the perspective of the target biological particle 301, any slight change in the contactless selection device 100 would have a significant influence thereon. Accordingly, the above description in the present embodiment describes the size and arrangement of the emitter pads 1332 of the vertical transistor 130 that are provided to facilitate the selection of the target biological particle 301 by an electric field difference that is progressively distributed, but the present disclosure is not limited thereto.

As shown in FIG. 4 to FIG. 7, in the vertical transistor 130 of the present embodiment, the emitter pads 1332 include at least one first pad 1332*a* arranged along an inner ring-shaped path P1, a centric pad 1332*d* arranged inside of the inner ring-shaped path P1, at least one second pad 1332*b* arranged along an outer ring-shaped path P2, and at least one third pad 1332*c* that is arranged along an additional ring-shaped path P3. The outer ring-shaped path P2 surrounds the inner ring-shaped path P1, and the additional ring-shaped path P3 is located between the inner ring-shaped path P1 and the outer ring-shaped path P2, but the present disclosure is not limited thereto. For example, in other embodiments of the present disclosure not shown in the drawings, the centric pad 1332*d* and/or the at least one third pad 1332*c* can be omitted according to design requirements; or, a quantity of the additional ring-shaped path P3 between the inner ring-shaped path P1 and the outer ring-shaped path P2 can be at least two.

Specifically, a width W1332*d* of the centric pad 1332*d*, a width W1332*a* of the at least one first pad 1332*a*, and a width W1332*b* of the at least one second pad 1332*b* are different from each other, and a width W1332*c* of the at least one third pad 1332*c* is within a range from the width W1332*a* of the at least one first pad 1332*a* to the width W1332*b* of the at least one second pad 1332*b*. In the present embodiment, widths of the emitter pads 1332 gradually decrease in a direction from the outer ring-shaped path P2 toward the centric pad 1332*d*. In other words, the emitter pads 1332 can be listed as follows in an order from largest to smallest in width: the second pad 1332*b*, the third pad 1332*c*, the first pad 1332*a*, and the centric pad 1332*d*.

In addition, the specific distribution, quantity, and shape of the at least one first pad 1332*a*, the at least one second pad 1332*b*, and the at least one third pad 1332*c* can be adjusted or changed according to design requirements, and the following description of the present embodiment only describes three possible configurations, but the present disclosure is not limited thereto. For example, in other embodiments of the present disclosure not shown in the drawings, the specific distribution, quantity, and shape of the at least one first pad 1332*a*, the at least one second pad 1332*b*, and the at least one third pad 1332*c* can be provided as a mix of the three possible configurations described below.

Figure 6:
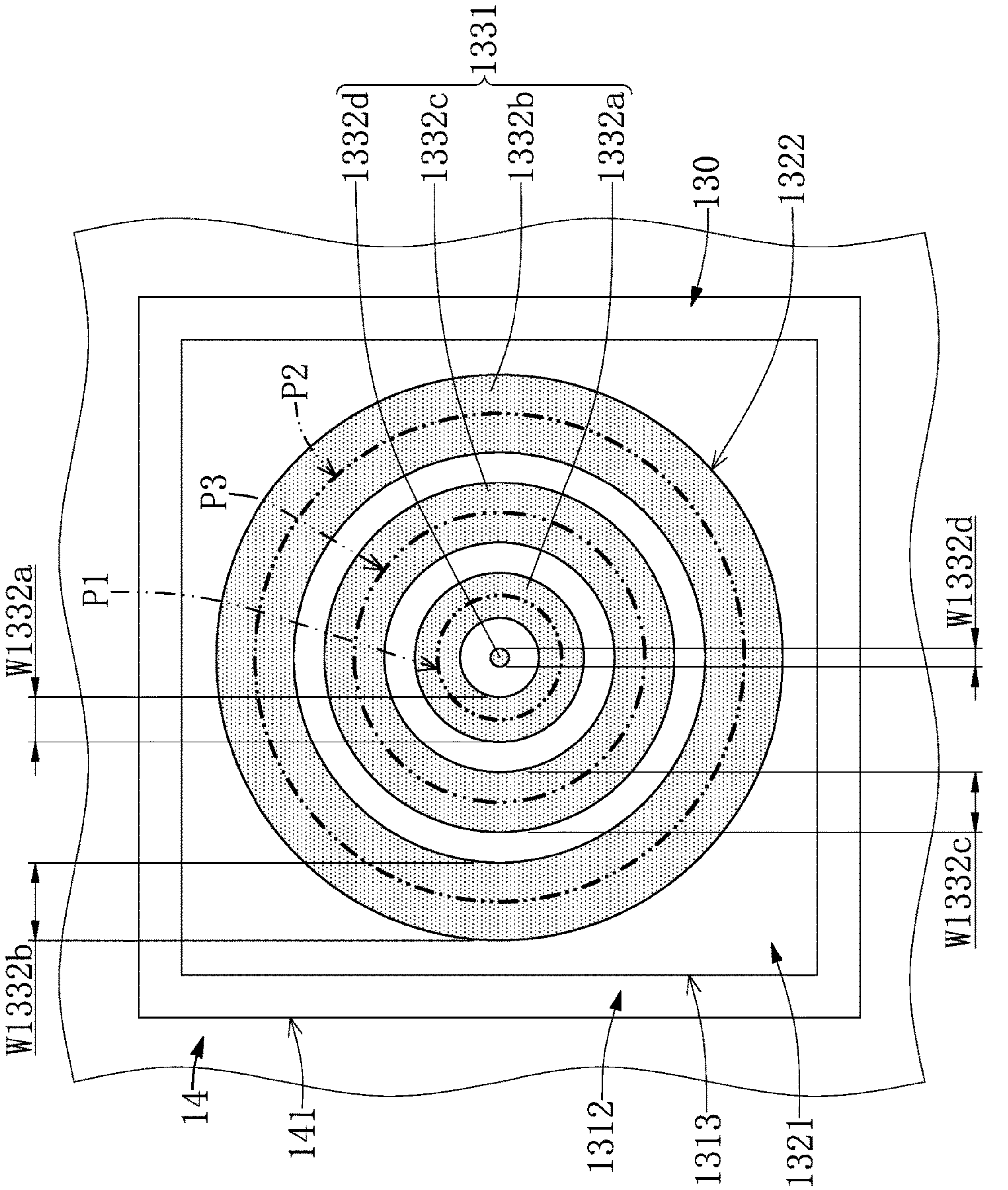
FIG. 6 is a top view showing one of vertical transistors of FIG. 4.

In the vertical transistor 130 shown in FIG. 5 and FIG. 6, each of a quantity of the at least one first pad 13321, a quantity of the at least one second pad 1332*b*, and a quantity of the at least one third pad 1332*c* is only one, and each of the first pad 1332*a*, the second pad 1332*b*, and the third pad 1332*c* is in a ring shape (e.g., a square-ring shape, a rectangular-ring shape, or a circular-ring shape).

Figure 7:
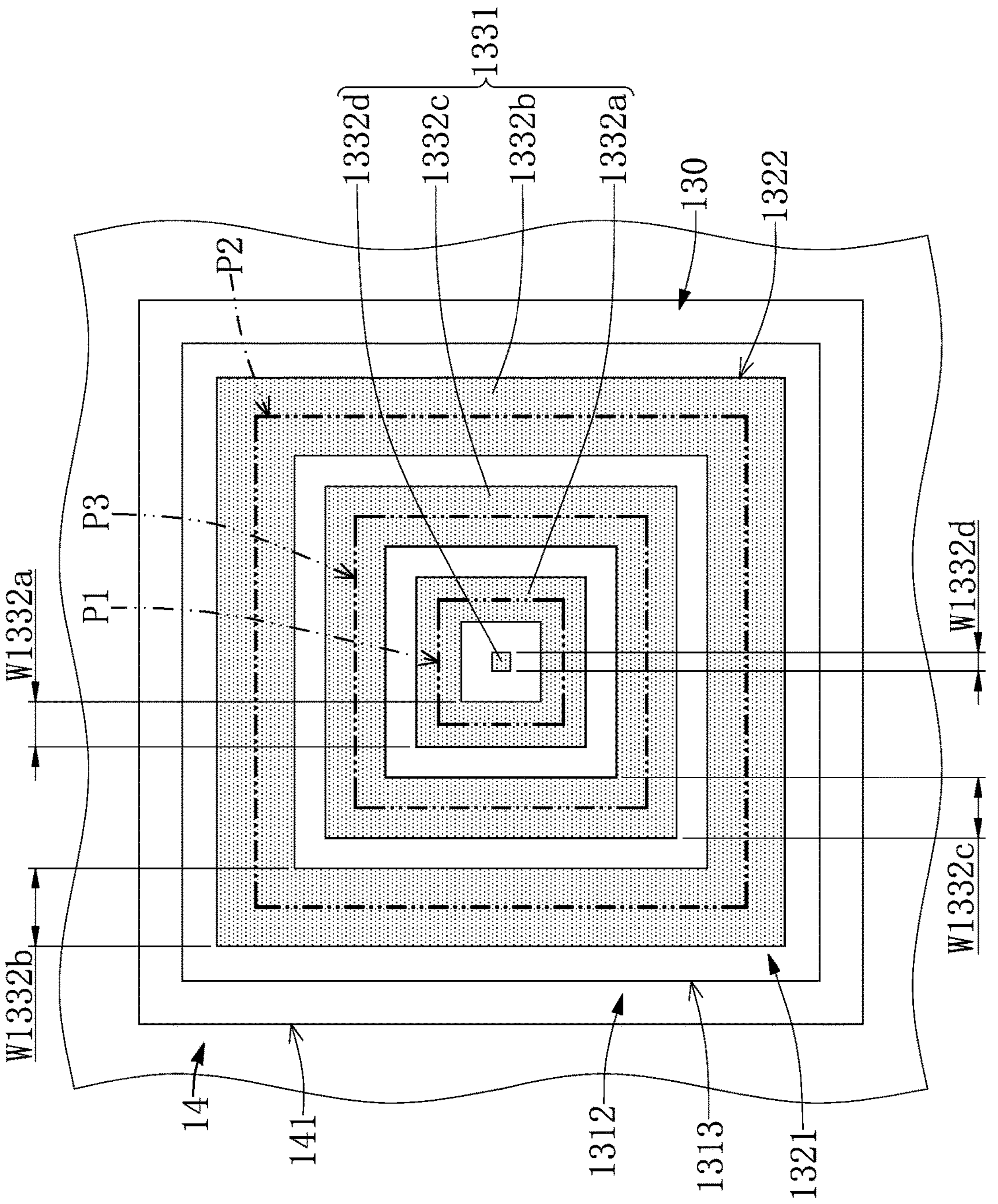
FIG. 7 is a top view showing the vertical transistor of FIG. 6 in another configuration.
Figure 8:
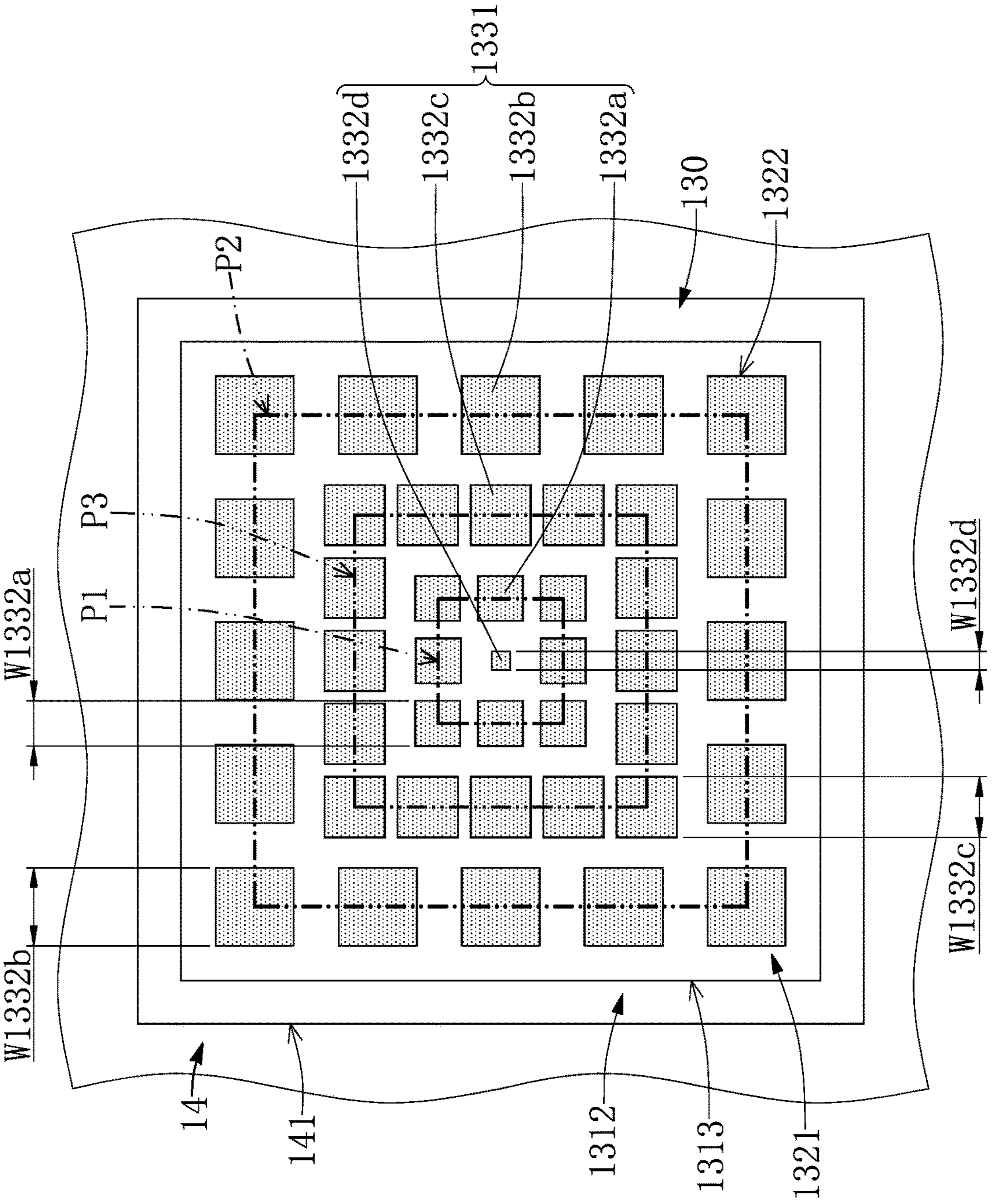
FIG. 8 is a top view showing the vertical transistor of FIG. 6 in still another configuration.
Figure 9:
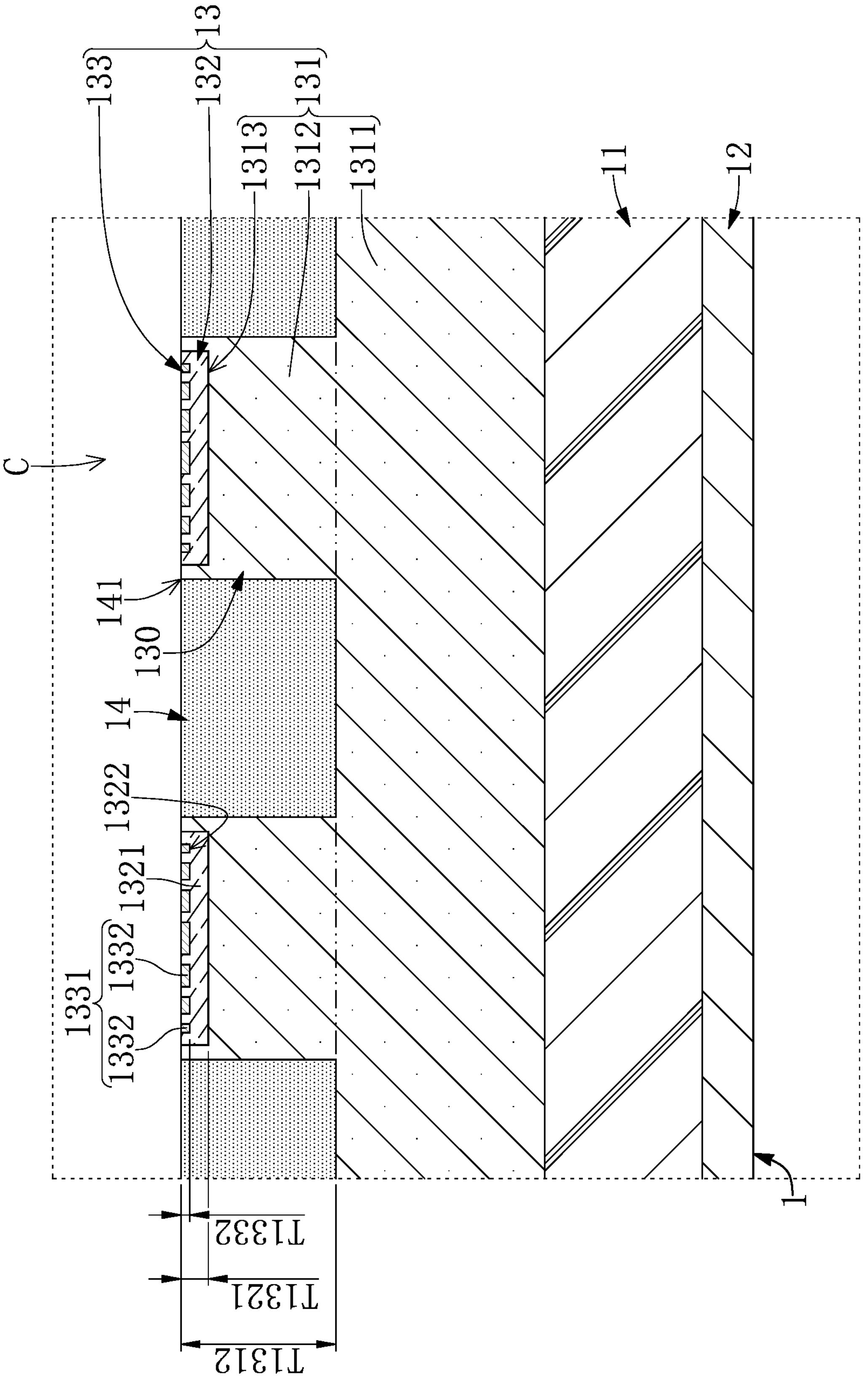
FIG. 9 is an enlarged cross-sectional view of a light sensing structure according to a second embodiment of the present disclosure.
Figure 10:
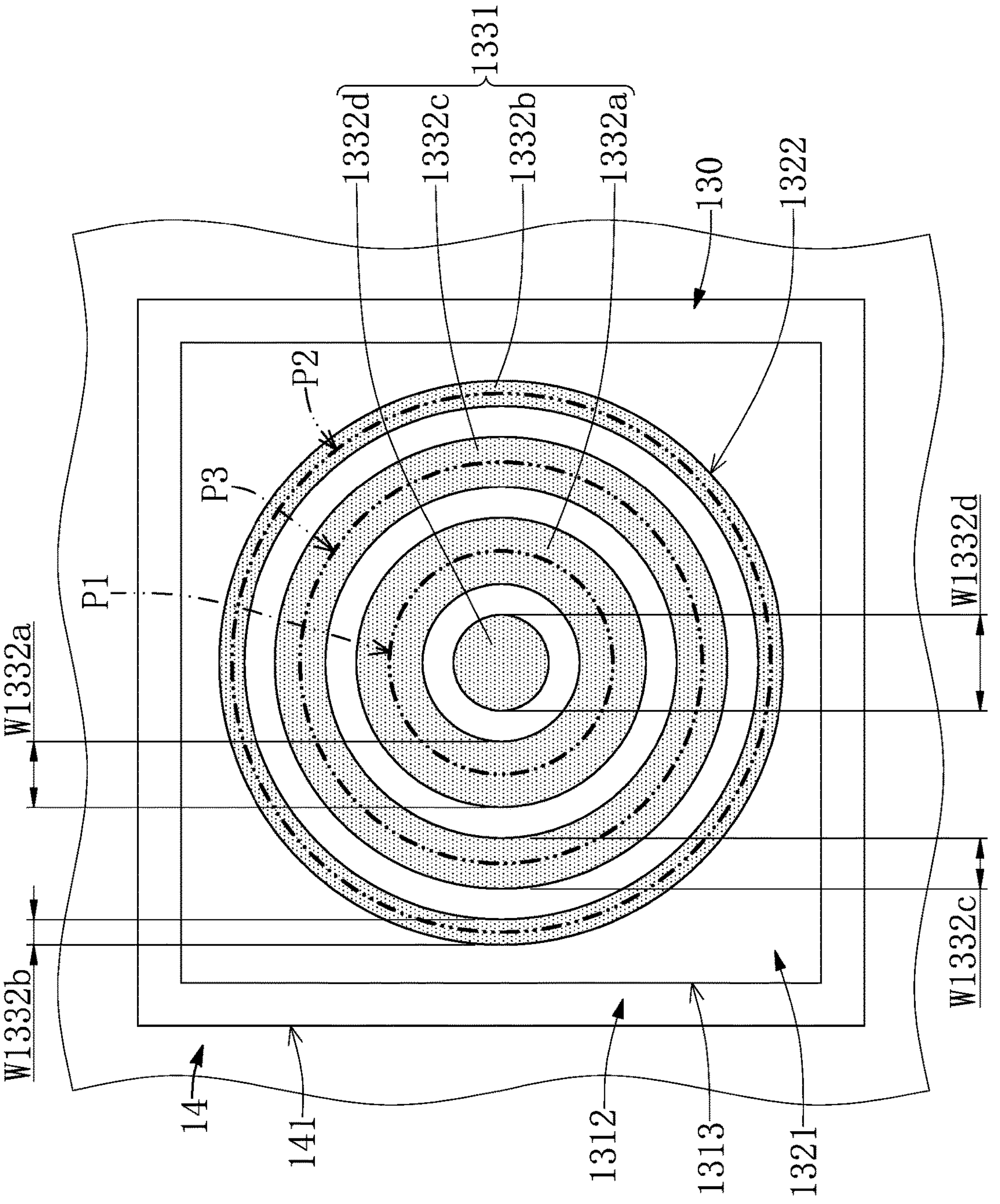
FIG. 10 is a top view showing one of the vertical transistors of FIG. 9.
Figure 11:
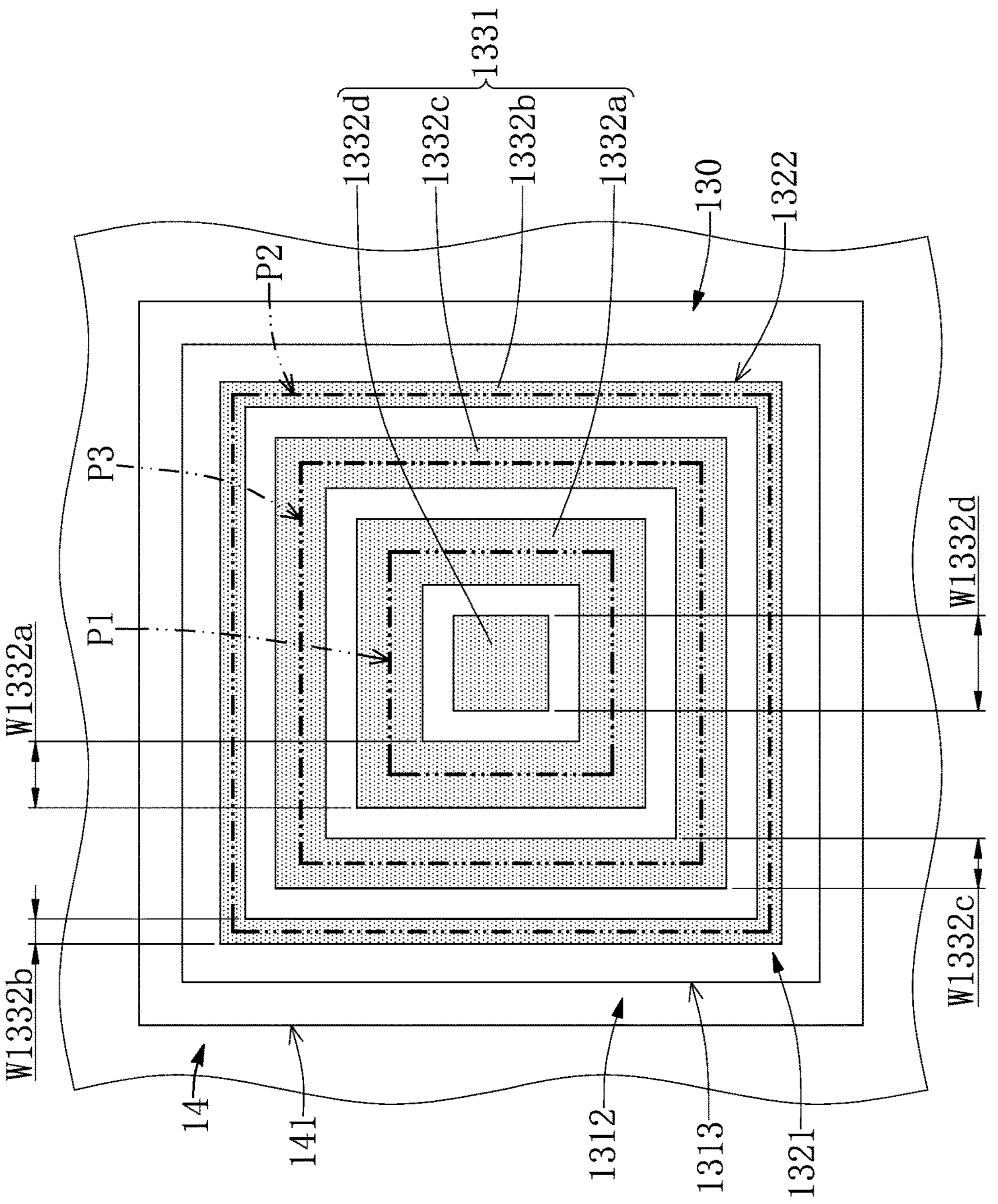
FIG. 11 is a top view showing the vertical transistor of FIG. 10 in another configuration.
Figure 12:
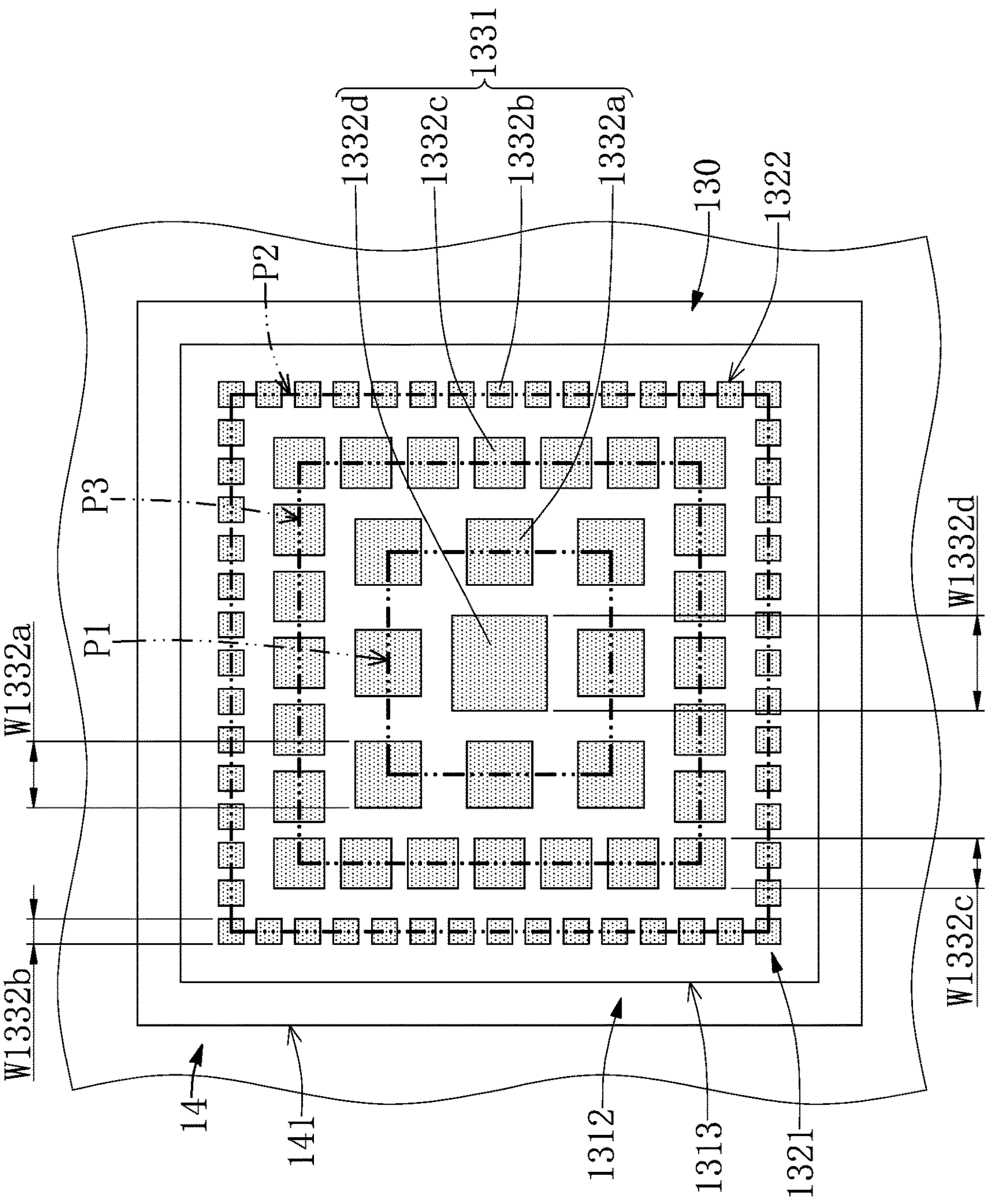
FIG. 12 is a top view showing the vertical transistor of FIG. 10 in still another configuration.

In the vertical transistor 130 shown in FIG. 7, each of a quantity of the at least one first pad 13321, a quantity of the at least one second pad 1332*b*, and a quantity of the at least one third pad 1332*c* is more than one, and each of the first pad 1332*a*, the second pad 1332*b*, and the third pad 1332*c* is in a square shape, a rectangular shape, or a shape that can be changed according to design requirements. Specifically, the quantity of the first pads 1332*a* is less than the quantity of the second pads 1332*b*, and the quantity of the third pads 1332*c* is also less than the quantity of the second pads 1332*b*. Moreover, the centric pad 1332*d* is in a square shape or a rectangular shape and defines two diagonals, and an extension of any one of the two diagonals passes through two of the first pads 1332*a* respectively located at two opposite sides of the centric pad 1332*d*, two of the second pads 1332*b* respectively located at two opposite sides of the centric pad 1332*d*, and two of the third pads 1332*c* that are respectively located at two opposite sides of the centric pad 1332*d*, but the present disclosure is not limited thereto.

As shown in FIG. 2 to FIG. 4, the mating structure 2 includes a second substrate 21 and a second electrode layer 22 that is formed on the second substrate 21 and that faces toward the light sensing structure 1. The bonding layer 3 is connected to and arranged between the light sensing structure 1 and the mating structure 2 (e.g., the insulating layer 14 and the second electrode layer 22) so as to jointly define an accommodating space C. The accommodating space C between the insulating layer 14 and the second electrode layer 22 of the contactless selection device 100 is configured to accommodate the liquid specimen 300 for implementing a selection process on the target biological particle 301.

Specifically, at least one of the mating structure 2 and the bonding layer 3 has an inlet E and an outlet O (shown in FIG. 2 and FIG. 3), which are respectively in spatial communication with two ends of the accommodating space C. The liquid specimen 300 can be injected into the contactless selection device 100 through the inlet E, and can flow out of the contactless selection device 100 through the outlet O.

It should be noted that the light sensing structure 1 of the contactless selection device 100 provided by the present embodiment is in cooperation with the mating structure 2 and the bonding layer 3, but the present disclosure is not limited thereto. For example, in other embodiments of the present disclosure not shown in the drawings, the bonding layer 3 of the contactless selection device 100 can be omitted or can be replaced by other structures; or, the light sensing structure 1 can be independently used (e.g., sold) or can be used in cooperation with other devices.

The AC power device 200 is electrically coupled to the first electrode layer 12 and the second electrode layer 22 of the contactless selection device 100. When the liquid specimen 300 is located between the insulating layer 14 and the second electrode layer 22 of the contactless selection device 100, any one of the vertical transistors 130 of the contactless selection device 100 is configured to be irradiated by a light source P so as to allow a plurality of dielectrophoresis (DEP) forces to be applied to move the target biological particle 301 through a distribution of the emitter pads 1332 and an electric field difference that is generated in the liquid specimen 300 from non-uniform electric fields of the emitter pads 1332.

Accordingly, the photoelectric layer 13 of the biological particle selection apparatus 1000 (or the contactless selection device 100) provided by the present embodiment has a specific structural design, so that the emitter pads 1332 of any one of the vertical phototransistors 130 can be used in a contactless photoelectric coupling manner to generate the electric fields jointly forming the electric field difference that is similar to a corona discharge, thereby enabling the emitter pads 1332 of any one of the vertical phototransistors 130 to accurately move (or capture) the target biological particle 301 to any position.

Second Embodiment

Referring to FIG. 9 to FIG. 12, a second embodiment of the present disclosure is provided, which is similar to the first embodiment of the present disclosure. For the sake of brevity, descriptions of the same components in the first and second embodiments of the present disclosure will be omitted herein, and the following description only discloses different features between the first and second embodiments.

In each of the vertical transistors 130 of the present embodiment, the widths of the emitter pads 1332 gradually increase in a direction from the outer ring-shaped path P2 toward the centric pad 1332*d*. In other words, the emitter pads 1332 can be listed as follows in an order from smallest to largest in width: the second pad 1332*b*, the third pad 1332*c*, the first pad 1332*a*, and the centric pad 1332*d*.

Third Embodiment

Figure 13:
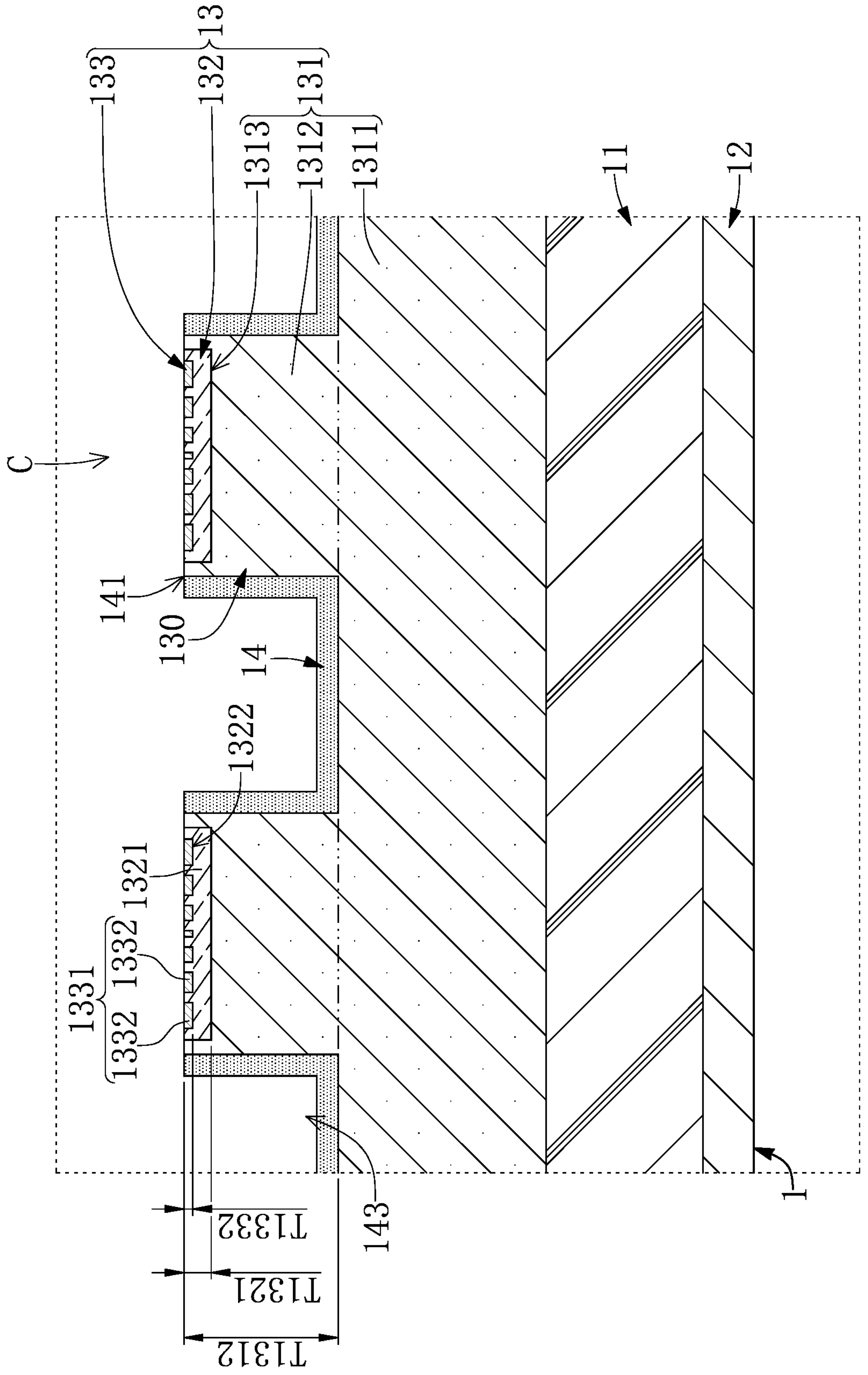
FIG. 13 is an enlarged cross-sectional view of the light sensing structure according to a third embodiment of the present disclosure.
Figure 14:
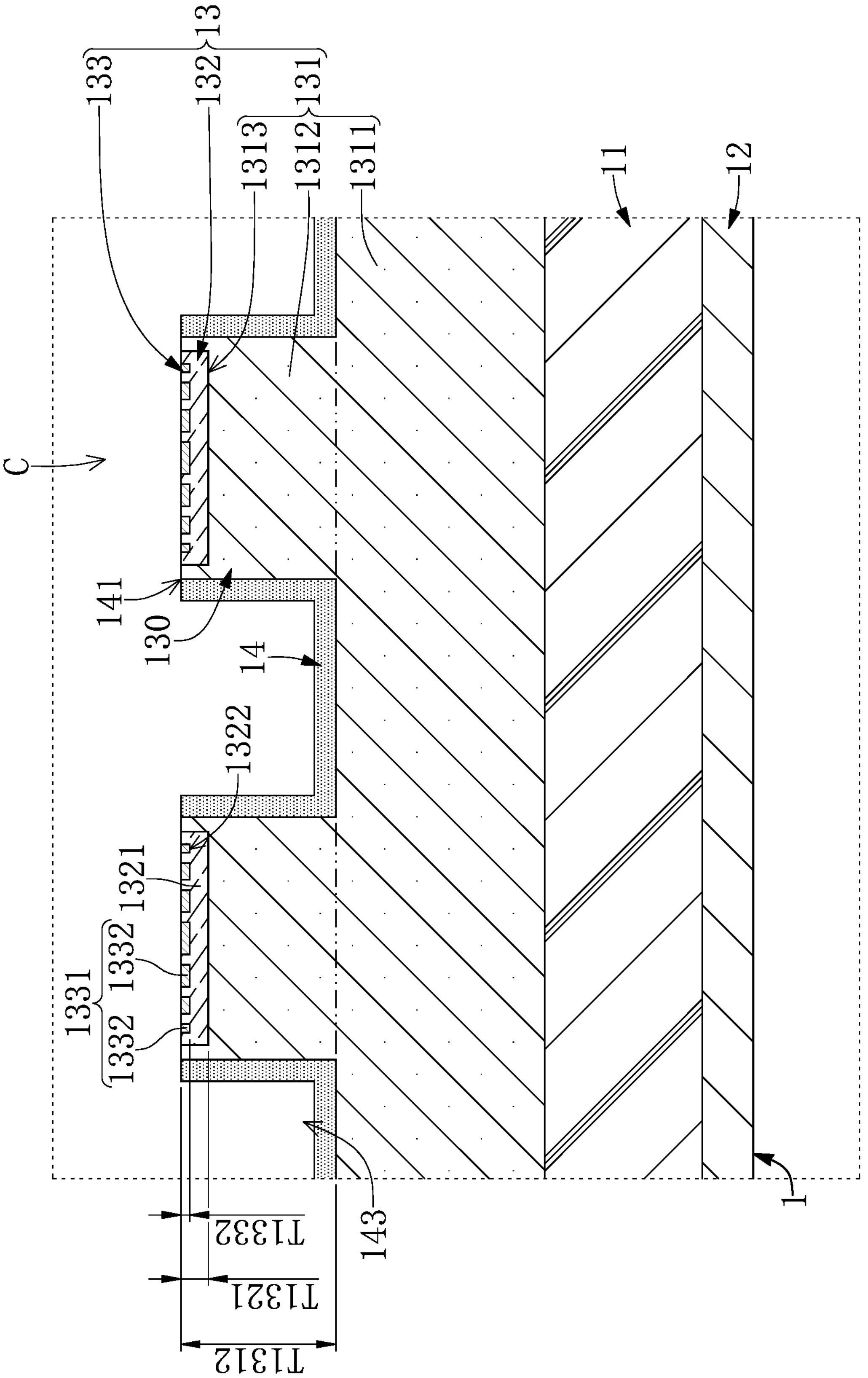
FIG. 14 is an enlarged cross-sectional view of the light sensing structure in another configuration according to the third embodiment of the present disclosure.

Referring to FIG. 13 and FIG. 14, a third embodiment of the present disclosure is provided, which is similar to the first and second embodiments of the present disclosure. For the sake of brevity, descriptions of the same components in the first to third embodiments of the present disclosure will be omitted herein, and the following description only discloses different features among the third embodiment and the first and second embodiments.

In the present embodiment, the insulating layer 14 has a patterned trench 143 to separate the vertical transistors 130 from each other, so that any two of the vertical transistors 130 adjacent to each other have an air gap therebetween. In other words, the insulating layer 14 covers and is connected to the connection layer 1311 and a surrounding lateral surface of each of the vertical transistors 130.

Accordingly, the biological particle selection apparatus (not labeled in the drawings) of the present embodiment is provided with a biomimetic structure that is formed by the light sensing structure 1, so that the biomimetic structure can be used to stimulate the target biological particle (not shown in the drawings) for meeting cultivation requirements of the target biological particle. For example, the vertical transistors 130 are spaced apart from each other, and the insulating layer 14 is formed with the patterned trench 143 to be cooperated with the vertical transistors 130, thereby jointly forming an environment (e.g., a bumpy environment) that facilitates culturing of the target biological particle.

Beneficial Effects of the Embodiments

In conclusion, the photoelectric layer provided in the contactless selection device, the light sensing structure, or the biological particle selection apparatus of the present disclosure has a specific structural design, so that the emitter pads of any one of the vertical phototransistors can be used in a contactless photoelectric coupling manner to generate the electric fields jointly forming the electric field difference that is similar to a corona discharge, thereby enabling the emitter pads of any one of the vertical phototransistors to accurately move (or capture) the target biological particle to any position.

Moreover, in the contactless selection device, the light sensing structure, and the biological particle selection apparatus provided by the present disclosure, the size and arrangement of the emitter pads of each of the vertical transistors can be changed according to design requirements (e.g., widths of the emitter pads gradually decrease or increase in a direction from the outer ring-shaped path toward the centric pad) for facilitating the selection of the target biological particle under a relatively low external force by an electric field difference that is progressively distributed.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A biological particle selection apparatus for selecting a target biological particle from a liquid specimen, the biological particle selection apparatus comprising:

- a contactless selection device including:
  - a light sensing structure including:
    - a first substrate;
    - a first electrode layer formed on one side of the first substrate;
    - a photoelectric layer formed on another side of the first substrate and including:
      - a collector layer formed on the first substrate, wherein the collector layer includes a plurality of collector regions spaced apart from each other, and an end of each of the collector regions away from the first electrode layer has a first slot-like portion;

a plurality of base regions respectively formed in the first slot-like portions of the collector regions, wherein an end of each of the base regions away from the first electrode layer has a plurality of second slot-like portions spaced apart from each other; and a plurality of emitter regions respectively formed in the base regions, wherein each of the emitter regions includes a plurality of emitter pads respectively formed in the second slot-like portions of a corresponding one of the base regions, and wherein each of the base regions, a corresponding one of the collector regions, and a corresponding one of the emitter regions are jointly formed as a vertical transistor; and an insulating layer covering the vertical transistors and separating the vertical transistors from each other, wherein an end of each of the emitter pads away from the first electrode layer is exposed from the insulating layer; and a mating structure spaced apart from the light sensing structure, wherein at least one of the mating structure and the light sensing structure is transparent, and the mating structure includes a second substrate and a second electrode layer that is formed on the second substrate and that faces toward the light sensing structure; and an alternating current (AC) power device electrically coupled to the first electrode layer and the second electrode layer;

wherein, when the liquid specimen is located between the insulating layer and the second electrode layer of the contactless selection device, any one of the vertical transistors of the contactless selection device is configured to be irradiated by a light source so as to enable a plurality of dielectrophoresis (DEP) forces to be applied to move the target biological particle through a distribution of the emitter pads and an electric field difference that is generated in the liquid specimen from non-uniform electric fields of the emitter pads.

2. The biological particle selection apparatus according to claim 1, wherein in each of the vertical transistors, the emitter pads include at least one first pad arranged along an inner ring-shaped path and at least one second pad that is arranged along an outer ring-shaped path surrounding the inner ring-shaped path, and a width of the at least one first pad is different from a width of the at least one second pad.

3. The biological particle selection apparatus according to claim 2, wherein in each of the vertical transistors, the emitter pads include at least one third pad arranged along an additional ring-shaped path located between the inner ring-shaped path and the outer ring-shaped path, and a width of the at least one third pad is within a range from the width of the at least one first pad and the width of the at least one second pad.

4. The biological particle selection apparatus according to claim 3, wherein in each of the vertical transistors, each of a quantity of the at least one first pad, a quantity of the at least one second pad, and a quantity of the at least one third pad is one, and each of the first pad, the second pad, and the third pad is in a ring shape.

5. The biological particle selection apparatus according to claim 3, wherein in each of the vertical transistors, each of a quantity of the at least one first pad, a quantity of the at least one second pad, and a quantity of the at least one third pad is more than one, the quantity of the first pads is less than the quantity of the second pads, and the quantity of the third pads is less than the quantity of the second pads.

6. The biological particle selection apparatus according to claim 1, wherein in each of the vertical transistors, the emitter pads include at least one first pad arranged along an inner ring-shaped path, a centric pad arranged inside of the inner ring-shaped path, at least one second pad that is arranged along an outer ring-shaped path surrounding the inner ring-shaped path, and widths of the emitter pads gradually decrease or increase in a direction from the outer ring-shaped path toward the centric pad, so that the electric field difference is progressively distributed.

7. The biological particle selection apparatus according to claim 6, wherein in each of the vertical transistors, the centric pad is in a square shape or a rectangular shape and defines two diagonals, each of a quantity of the at least one first pad and a quantity of the at least one second pad is more than one, and an extension of any one of the two diagonals passes through two of the first pads that are respectively located at two opposite sides of the centric pad and two of the second pads that are respectively located at two opposite sides of the centric pad.

8. The biological particle selection apparatus according to claim 1, wherein in each of the vertical transistors, the end of the collector region, the end of the base region, and the end of each of the emitter pads are coplanar with each other.

9. The biological particle selection apparatus according to claim 1, wherein in each of the vertical transistors, each of the emitter pads has a width greater than a thickness thereof, and any two of the emitter pads adjacent to each other have a distance therebetween that is less than 5 μm.

10. The biological particle selection apparatus according to claim 1, wherein a space between any two of the vertical transistors adjacent to each other is fully filled with the insulating layer, the insulating layer has a plurality of openings respectively corresponding in position to the vertical transistors, and the ends of the emitter pads of each of the vertical transistors are exposed from the insulating layer through a corresponding one of the openings.

11. The biological particle selection apparatus according to claim 1, wherein a space between any two of the vertical transistors adjacent to each other is fully filled with the insulating layer, the insulating layer has a plurality of openings respectively corresponding in position to the emitter pads of the vertical transistors, and the end of each of the emitter pads is exposed from the insulating layer through a corresponding one of the openings.

12. The biological particle selection apparatus according to claim 1, wherein the insulating layer has a patterned trench to separate the vertical transistors from each other, so that any two of the vertical transistors adjacent to each other have an air gap therebetween.

13. The biological particle selection apparatus according to claim 12, wherein the collector layer includes a connection layer formed on the first substrate, and the collector regions are formed on the connection layer.

14. A contactless selection device for selecting a target biological particle from a liquid specimen, the contactless selection device comprising:

a light sensing structure including:

a first substrate;

a first electrode layer formed on one side of the first substrate;

a photoelectric layer formed on another side of the first substrate and including:

a collector layer formed on the first substrate, wherein the collector layer includes a plurality of collector regions spaced apart from each other, and an end of each of the collector regions away from the first electrode layer has a first slot-like portion;

a plurality of base regions respectively formed in the first slot-like portions of the collector regions, wherein an end of each of the base regions away from the first electrode layer has a plurality of second slot-like portions spaced apart from each other; and a plurality of emitter regions respectively formed in the base regions, wherein each of the emitter regions includes a plurality of emitter pads respectively formed in the second slot-like portions of a corresponding one of the base regions, and wherein each of the base regions, a corresponding one of the collector regions, and a corresponding one of the emitter regions are jointly formed as a vertical transistor; and an insulating layer covering the vertical transistors and separating the vertical transistors from each other, wherein an end of each of the emitter pads away from the first electrode layer is exposed from the insulating layer; and a mating structure spaced apart from the light sensing structure, wherein at least one of the mating structure and the light sensing structure is transparent, and the mating structure includes a second substrate and a second electrode layer that is formed on the second substrate and that faces toward the light sensing structure; and wherein a space between the insulating layer and the second electrode layer of the contactless selection device is configured to accommodate the liquid specimen for implementing a selection process on the target biological particle.

15. The contactless selection device according to claim 14, wherein in each of the vertical transistors, the emitter pads include a plurality of first pads arranged along an inner ring-shaped path, a centric pad arranged inside of the inner ring-shaped path, a plurality of second pads arranged along an outer ring-shaped path, a plurality of third pads that are arranged along an additional ring-shaped path, the outer ring-shaped path surrounds the inner ring-shaped path, the additional ring-shaped path is located between the inner ring-shaped path and the outer ring-shaped path, and widths of the emitter pads gradually decrease or increase in a direction from the outer ring-shaped path toward the centric pad.

16. The contactless selection device according to claim 15, wherein in each of the vertical transistors, the centric pad is in a square shape or a rectangular shape and defines two diagonals, and an extension of any one of the two diagonals passes through two of the first pads respectively located at two opposite sides of the centric pad, two of the second pads respectively located at two opposite sides of the centric pad, and two of the third pads that are respectively located at two opposite sides of the centric pad.

17. The contactless selection device according to claim 14, wherein in each of the vertical transistors, the emitter pads include a first pad having a ring shape, a centric pad arranged inside of the first pad, a second pad having a ring shape and surrounding the first pad, and a third pad that has a ring shape and that is arranged between the first pad and the second pad, and widths of the emitter pads gradually decrease or increase in a direction from the second pad toward the centric pad.

18. A light sensing structure of a contactless selection device, comprising:

a first substrate;

a first electrode layer formed on one side of the first substrate;

a photoelectric layer formed on another side of the first substrate and including:

a collector layer formed on the first substrate, wherein the collector layer includes a plurality of collector regions spaced apart from each other, and an end of each of the collector regions away from the first electrode layer has a first slot-like portion;

a plurality of base regions respectively formed in the first slot-like portions of the collector regions, wherein an end of each of the base regions away from the first electrode layer has a plurality of second slot-like portions spaced apart from each other; and a plurality of emitter regions respectively formed in the base regions, wherein each of the emitter regions includes a plurality of emitter pads respectively formed in the second slot-like portions of a corresponding one of the base regions, and wherein each of the base regions, a corresponding one of the collector regions, and a corresponding one of the emitter regions are jointly formed as a vertical transistor; and an insulating layer covering the vertical transistors and separating the vertical transistors from each other, wherein an end of each of the emitter pads away from the first electrode layer is exposed from the insulating layer.

19. The light sensing structure according to claim 18, wherein in each of the vertical transistors, the end of the collector region, the end of the base region, and the end of each of the emitter pads are coplanar with each other, each of the emitter pads has a width greater than a thickness thereof, and any two of the emitter pads adjacent to each other have a distance therebetween that is less than 5 μm.

20. The light sensing structure according to claim 18, wherein the base regions are located at a same height with respect to the first electrode layer and are jointly defined as a base layer, and the emitter regions are located at a same height with respect to the first electrode layer and are jointly defined as an emitter layer, and wherein the collector layer is a N-type layer, the base layer is a P-type layer, and the emitter layer is a heavily doped N-type layer.

* * * * *